US009277056B2

(12) United States Patent
Leerentveld et al.

(10) Patent No.: US 9,277,056 B2
(45) Date of Patent: Mar. 1, 2016

(54) CONFERENCE ROOM AUDIO/VIDEO CABLE INTERFACE DEVICE

(71) Applicant: Crestron Electronics, Inc., Rockleigh, NJ (US)

(72) Inventors: Toine Leerentveld, Keyport, NJ (US); Daniel Jackson, Valhalla, NY (US); Josh Stene, New Windsor, NY (US); Fred Bargetzi, Rockleigh, NJ (US)

(73) Assignee: Crestron Electronics Inc., Rockleigh, NJ (US)

( * ) Notice: Subject to any disclaimer, the term of this patent is extended or adjusted under 35 U.S.C. 154(b) by 0 days.

(21) Appl. No.: 14/302,996

(22) Filed: Jun. 12, 2014

(65) Prior Publication Data

US 2015/0195492 A1     Jul. 9, 2015

Related U.S. Application Data

(60) Provisional application No. 61/924,350, filed on Jan. 7, 2014.

(51) Int. Cl.
*H04N 7/15* (2006.01)
*H04M 3/56* (2006.01)

(52) U.S. Cl.
CPC ............. *H04M 3/567* (2013.01); *H04N 7/15* (2013.01)

(58) Field of Classification Search
CPC .............................. H04N 7/152; H04M 3/567
USPC ............... 248/51; 370/469; 381/119; 463/31; 701/23; 715/744, 716; 725/34, 51; 348/14.03; 704/503
See application file for complete search history.

(56) References Cited

U.S. PATENT DOCUMENTS

| 3,646,244 | A | | 2/1972 | Cole | |
|---|---|---|---|---|---|
| 5,553,864 | A | * | 9/1996 | Sitrick | ............................ 463/31 |
| 5,940,521 | A | * | 8/1999 | East et al. | ..................... 381/119 |
| 7,163,409 | B1 | | 1/2007 | Chen et al. | |
| D553,306 | S | | 10/2007 | Hansen | |
| 7,806,723 | B2 | | 10/2010 | Chong et al. | |
| 7,822,065 | B2 | * | 10/2010 | Lu | ................................ 370/469 |
| 7,827,488 | B2 | * | 11/2010 | Sitrick | ................... G09G 5/377 715/716 |
| 8,007,295 | B2 | | 8/2011 | Lin | |
| D647,853 | S | | 11/2011 | Kan | |
| 8,260,482 | B1 | * | 9/2012 | Szybalski et al. | ................ 701/23 |
| 8,560,331 | B1 | * | 10/2013 | Pereira | ................. H04N 21/431 704/503 |
| 2002/0074460 | A1 | * | 6/2002 | Behar | ............................. 248/51 |

(Continued)

OTHER PUBLICATIONS

Product Data Sheet for "Pixel" by Office Electrics, www.office-electrics.com, www.elsafe.com/au, Dec. 23, 2013.

*Primary Examiner* — Gerald Gauthier

(74) *Attorney, Agent, or Firm* — CrestonElectronics Inc.

(57) ABSTRACT

A cable management hub for use in providing an interface between one or more pieces of audio-visual presentation equipment and a laptop. The cable management hub comprises a first portion that includes one or more cables that mate with respective cables from the laptop. The cable management hub further includes one or more buttons, each of which is configured to generate an electrical signal when pressed by a user that indicates a desire by the user to transfer control of the audio-visual presentation equipment from a previous user, if one exists, to the user that pressed the button. If no one had control, then the user that presses the button would gain control of the audio-visual equipment. The cable management hub further includes one or more illuminated indicators configured to illuminate in a manner indicative of a received status condition signal.

19 Claims, 12 Drawing Sheets

(56) References Cited

U.S. PATENT DOCUMENTS

| | | | |
|---|---|---|---|
| 2003/0028884 A1* | 2/2003 | Swart et al. | 725/51 |
| 2012/0305868 A1 | 12/2012 | Callahan et al. | |
| 2013/0174045 A1* | 7/2013 | Sarukkai et al. | 715/744 |
| 2013/0247096 A1* | 9/2013 | Miller et al. | 725/34 |
| 2013/0324244 A1* | 12/2013 | Mikhailov et al. | 463/31 |
| 2013/0327569 A1 | 12/2013 | Stathis et al. | |
| 2014/0179428 A1* | 6/2014 | Miura et al. | 463/31 |
| 2015/0008805 A1 | 1/2015 | Kramer | |
| 2015/0195492 A1* | 7/2015 | Leerentveld | H04N 7/15 348/14.03 |

* cited by examiner

CONFERENCE ROOM AUDIO/VIDEO CABLE INTERFACE DEVICE

PRIORITY INFORMATION

The present application claims priority under 35 U.S.C. §119(e) to U.S. Provisional Patent Application Ser. No. 61/924,350 entitled "Cable Management System," filed Jan. 7, 2014, the entire contents of which are expressly incorporated herein by reference.

BACKGROUND OF THE INVENTION

1. Technical Field

The embodiments described herein generally relate to cable management systems. More particularly, the embodiments relate to a cable management and active-user notification system for use in a conference room environment.

2. Background

Currently available conference room audio/video (A/V) systems typically do not provide a simple solution for the interface or switching of portable electronics sources to a primary display and audio system. Conventional systems generally have one or more complex, remotely located integrated control panels/interfaces to allow switching between devices (e.g. computers, video players, audio/voice amplifiers, internet access, among others), other room controls (lighting, drapery and shade systems, air-conditioning, heating, and ventilation), and A/V controls, making it confusing to just switch control of the one or more plurality of devices/systems within the room from one device to another.

Moreover, it is not always apparent (to the other occupants) whose device is controlling the one or more A/V devices because normally, the light emitting diodes (LEDs), or other visible notification means, which are illuminating the control panel, usually face one direction (generally towards the primary user, but not always), making it even more difficult for the primary user to control the one or more systems. Additionally, installation of conference room A/V systems is fairly time consuming and expensive.

Furthermore, integrating pass-through power access to portable devices is also cumbersome, as power outlets are typically well below the surface of the table, and also can be located in obscure, difficult to access (to meet Underwriter Laboratories® (UL) requirements), water-resistant locations.

FIGS. 1 and 2 illustrate views of a conventional conference room 100 with A/V devices that can generally be found in a large amount of conference rooms in corporations in the U.S., among other places. As those of skill in the art can appreciate, use of "conference rooms" and A/V control systems is not limited to corporations, but can further includes similar environments, such as classrooms (high schools, and colleges), government entities (such as different agencies, and the military), and just about any such group/entity that has a need to regularly meet and hold conferences to convey information to a plurality of people.

Conference room 100 includes display screen 112, table 118, speaker phone 114, laptop-control panel interface (CP interface) box 120, and A/V panel 102. A/V panel 102 includes Blu-Ray video disk player 104, amplifier 106, video cassette recorder and digital video disk (VCR/DVD) player 108, and lighting control 110. Located near, or part of control panel 102, is wireless gateway 122, which can receive wireless signals according to the one or more wireless protocol(s) in use (Wi-Fi, Bluetooth, among others), and control one or more of the devices within control panel 102. Connecting control panel (CP) 102 to laptop-control panel interface box (CP interface) 120 is CP interface-CP cable (CP cable) 128, and laptop 116 is connected to CP interface 120 via laptop-CP interface cable (CP interface cable) 130. It can be appreciated by those of skill in the art that although this background section, as well as the detailed description of the embodiments below, reference is made solely to laptop 116 as the device that interfaces to CP 102, other types of both portable and non-portable electronic processing devices can be used within any of the systems described herein; however, in fulfillment of the dual purposes of clarity and brevity, reference shall only be made to "laptops 116" (which are fairly ubiquitously used in conference rooms to provide presentations), but other types of devices can also be used, such as a personal computers, so-called smart phones (3G/4G-LTE), tablets, among other computer/processing devices.

CP 102, and one or more of the devices contained therein, are connected to ceiling mounted projector 124 that can display video, photos, or computer-generated images. CP 102, and one or more of the devices connected therein, are also connected to speakers 126, for projecting audio associated with teleconferences, videos, or computer generated videos, among other sources of audio information.

Several prior art devices have attempted to solve the problems outlined above. For example, U.S. Published Patent Application No 2013/0327659 by Stathis, et al., provides a power, communications and data grommet mounted in an aperture in a work surface. The grommet includes a housing adapted to fit into the aperture, with the housing comprising a cap removably connected to a liner. The liner includes an upper liner and a lower liner, with the upper liner flaring outwardly to prevent the grommet from falling through the aperture, and a substantially cylindrical lower liner having a threaded outer surface, and a lock ring having inner threads to be threadably attached to the lower liner.

PCT Published Patent Application No. WO 2013 111125 A2, by J. Kramer, describes a pop-up enclosure system for electronic equipment that includes a receptacle adapted for mounting in a work-surface and which contains one or more electrical outlets for connection of equipment thereto. The pop-up enclosure system by Kramer further includes a bezel supported by the receptacle and which is adapted for countersinking in said work-surface. A top plate is dimensioned for closing an opening defined by the bezel, and a hinge is mounted at an edge of the top plate and the bezel for hingedly attaching the top plate to the bezel so as to allow rotation of the top plate from a closed position to a fully open position wherein the edge of the top plate abuts an upper surface of the bezel. A releasable resilient opening force is the receptacle and articulated to the top plate for opening the top plate.

Another prior art grommet is described in U.S. Published Patent Application No. 2012/0305868, by Callahan et al., which provides a wall grommet that can be installed through the surfaces of walls to route wiring into the walls' interior spaces. The wall grommet is allegedly configured for running power cords inside walls and presenting the electrical connectors of a power cord in a manner such that power cords are hidden from view. The grommet can include a power module and a back cover. The power module itself comprises a housing, which defines an interior space that is adapted to hold either the female connector or male connector of a power cord. The back cover can be attached to the housing to secure the electrical connector of the power cord in the housing.

U.S. Pat. No. 8,007,295 to Lin discloses a reversible and concealable electrical power receptacle that includes a main body, a shaft section, an accommodating section, and an electrical outlet assembly. The electrical outlet assembly is disposed on the main body, and the accommodating section receives the main body, and the shaft section includes a first shaft member and a second shaft member. The second shaft member is coupled to the main body and perpendicular to the first shaft member. The main body is rotatable with respect to the first and the second shaft members transversely respectively. Consequently, the main body is able to rotate transversely and perpendicularly with respect to the accommodating section in accordance with the rotational movements of the first shaft and the second shaft members, resulting in an exposed state in use or a concealed state when not in use, thereby achieving effective space utilization.

A further conventional laptop cable interface device is described in a non-patent literature document that is a two-page marketing brochure, and which describes "Pixel," which is an Office Electrics device (a UK company). The "Pixel" document describes a device that can be configured as either a power-only interface, a data-only interface, or a combined power/data interface for use on a conference table, similar to that as shown in FIG. 1.

Thus far, the prior art's alleged solutions, describe above, provide very little in terms of integrating or providing means for accessing and manipulating conference room A/V systems by portable devices.

U.S. Pat. No. 7,806,723 to Chong, et al., however, is allegedly directed to an electrical grommet device, and methods of use and manufacture thereof. Accordingly, the electrical grommet device by Chong comprises a casing that includes a grommet that includes one or more first apertures and an insertion portion, and a connection mechanism capable of being coupled to the grommet. The electrical grommet device further includes one or more electrical components located at least partially within the casing, and one or more electrical connectors located at least partially within the casing and coupled to the one or more electrical components. The insertion portion of the electrical grommet device can allegedly be removably placed in a grommet hole from a first side of the grommet hole, and the electrical grommet device can further allegedly be removably coupled to the connection mechanism at a second side of the grommet hole opposite the first side.

U.S. Pat. No. 7,163,409 to Chen, et al, describes a modular integrated socket apparatus that includes a shell, a pop-up structure, an adapter module, a connector base, and a coupling device. The pop-up structure contains one or more electrical connectors, including power and signal connections. The pop-up structure, the adapter module, the connector base, and the coupling device are mounted in the shell. The adapter module is electrically connected to the connector base. When in use, the shell and the adapter module can be lifted and located higher than the table by use of the pop-up structure and the coupling device. As a result, access can therefore be made of the power and signal connectors on the pop up structure.

The table top connection box shown in U.S. Design Pat. No. D553,306, which apparently combines one or more electrical power and signal connectors in a single connection box that can be mounted on a table top.

U.S. Pat. No. 3,646,244 to Cole describes an adjustable floor receptacle mount that includes a housing movable within a stationary casing fitted into a circular opening in a concrete floor. The housing and the casing are each formed of a pair of interlocking extruded channel structures whose walls are shaped to facilitate the installation and operation of the floor receptacle mount. In order to simplify the withdrawing of the housing from a recessed position within the casing, a cap provided on a cover plate for the housing and operating in conjunction with a latching mechanism pops up when the housing is unlatched. The cap thus provides a convenient handle by which the housing can be quickly pulled out of the casing in the floor when it is desired to use the electrical service provided by the receptacles on the sides of the housing.

Thus, while the prior art described generally devices that provide table and floor recessed devices that provide for interconnection to one or more of power and signal connections, there is a need for an improved means for accessing and manipulating conference room A/V systems by portable devices.

SUMMARY OF THE INVENTION

It is to be understood that both the general and detailed descriptions that follow are exemplary and explanatory only and are not restrictive of the embodiments.

DISCLOSURE OF INVENTION

The aspects of the embodiments provide a conference room A/V cable management system that overcomes one or more of the problems discussed above in regard to the prior art. According to a first aspect of the embodiments, a cable management hub is provided for use in providing an interface between one or more pieces of audio-visual presentation equipment and an electronic processing device configured to generate one or more electrical signals that can connect to and cause at least one of an audio presentation and a visual presentation to be presented on said one or more pieces of audio-visual presentation equipment, the cable management hub comprising a first portion that includes one or more cables each with a respective cable connectors that are configured to mate with a respective cable from the electronic processing device and to carry respective electrical signals from the electronic processing device to the one or more pieces of audio-visual presentation equipment through the respective one or more cables, one or more buttons, each of which is configured to generate an electrical signal when pressed by a user of the electronic processing device that indicates a desire by the user to transfer control of the one or more pieces of audio-visual presentation equipment from the electronic processing device of a previous user of the one or more pieces of audio-visual presentation equipment should said control situation exist to the electronic processing device of the user that pressed a respective one of the one or more buttons, or to initiate control of the one or more pieces of audio-visual presentation equipment should said control situation not exist, and one or more illuminated indicators configured to illuminate in a manner indicative of a received status condition signal.

According to the first aspect of the embodiments, the cable management hub further comprises a hub circuit configured to receive and then process the one or more button generated electrical signals, and transmit the processed button generated electrical signals to a central device. According to the first aspect, the hub circuit is further configured to receive said status condition signal from said central device and transmit said status condition signal to said one or more illuminated indicators, causing said one or more illuminated indicators to illuminate in a manner according to the received status condition signal, and further wherein said status condition signal indicates a status condition of the one or more pieces of audio visual equipment and attached electronic processing device, wherein said status condition includes at least an indication of said control situation. According to the first aspect, the status condition signal conveys information regarding at least one of a lack of video source from the connected electronic processing device, a video source is connected from the connected electronic processing device and a visual presentation piece of equipment is in a warm-up power on phase, a video source from the connected electronic processing device is in control of said at least one piece of the one or more pieces of audio-visual presentation equipment, a video source from the connected electronic processing device is not in control of said at least one piece of the one or more pieces of audio-visual presentation equipment, and a button has been pressed but no video source from the connected electronic processing device is present.

According to the first aspect of the embodiments, the cable management hub can be used on a table in a conference room, and wherein the cable management hub further includes a container portion that extends through a hole in the table, from above an upper surface of the table to below a lower surface of the table, and wherein the container portion includes a recessed area, and the recessed area includes the one or more cable connectors, and wherein the cable management hub still further comprises a substantially planar upper portion that is part of an upper portion of the container portion and resides upon an upper surface of the table, and upon which resides the one or more buttons and illuminated indicators.

According to a second aspect of the embodiments, and audio-visual equipment management system is provided comprising at least one electronic processing device, one or more pieces of audio-visual presentation equipment, a central device electrically connected to both the at least one electronic processing device and the one or more pieces of audio-visual presentation equipment, and wherein the central device is configured to provide at least one of audio signals and video signals from the at least one electronic processing device to the one or more pieces of audio-visual presentation equipment, and a cable management hub positioned between the at least one electronic processing devices and the central device, and wherein the cable management hub includes one or more buttons, each of which is configured to generate an electrical signal when pressed by a user of the electronic processing device that indicates a desire by the user to transfer control of the one or more pieces of audio-visual presentation equipment from the electronic processing device of a previous user of the one or more pieces of audio-visual presentation equipment should said control situation exist, to the electronic processing device of the user that pressed a respective one of the one or more buttons, or to initiate control of the one or more pieces of audio-visual presentation equipment should said control situation not exist, and one or more illuminated indicators configured to illuminate in a manner indicative of a received status condition signal.

According to the second aspect of the embodiments, the cable management hub further comprises a hub circuit configured to receive and then process the one or more button generated electrical signals, and transmit the processed button generated electrical signals to the central device, and wherein said hub circuit is further configured to receive said status condition signal from said central device and transmit said status condition signal to said one or more illuminated indicators, causing said one or more illuminated indicators to illuminate in a manner according to the received status condition signal.

According to the second aspect of the embodiments, the status condition signal indicates a status condition of the one or more pieces of audio visual equipment and attached electronic processing device, wherein said status condition includes at least an indication of said control situation, and wherein said status condition signal conveys information regarding at least one of a lack of video source from the connected electronic processing device, a video source is connected from the connected electronic processing device and a visual presentation piece of equipment is in a warm-up power on phase, a video source from the connected electronic processing device is in control of said at least one piece of the one or more pieces of audio-visual presentation equipment, a video source from the connected electronic processing device is not in control of said at least one piece of the one or more pieces of audio-visual presentation equipment, and a button has been pressed but no video source from the connected electronic processing device is present.

According to the second aspect of the embodiments, the cable management hub can be used on a table in a conference room, and wherein said cable management hub further includes a container portion that includes one or more cables each with a respective cable connector that is configured to mate with a respective cable from said at least one electronic processing device and to carry respective electrical signals from said at least one electronic processing device to the one or more pieces of audio-visual presentation equipment through the respective one or more cables. According to the second aspect of the embodiments, the cable management hub further comprises a substantially planar upper portion that is part of an upper portion of the container portion and resides upon an upper surface of the table, and upon which resides the one or more buttons and illuminated indicators.

According to a third aspect of the embodiments, a method for controlling an audio-visual presentation equipment management system is provided, the method comprising determining whether a user of said audio-visual presentation equipment management system has indicated a request to assume control of said audio-visual presentation equipment management system, presenting at least one of an audio presentation and video presentation to said audio-visual presentation equipment management system if said user requesting control is ready to provide at least one of an audio presentation and video presentation to said audio-visual presentation equipment management system, and causing an illuminated indicator to illuminate to provide an indication that said user is in control of said audio-visual presentation equipment management system.

According to the third aspect of the embodiments, the step of determining comprises receiving one or more user status signals at a central location, determining a level of use and readiness for each of said users to use the audio-visual presentation equipment management system based on said received one or more user status signals, and determining if any of said users of said audio-visual presentation equipment management system has transmitted said request to assume control of said audio-visual presentation equipment management system. Still further according to the third aspect of the embodiments, the one or more user status signals include a lack of video source from the connected electronic processing device, a video source is connected from the connected electronic processing device and a visual presentation piece of equipment is in a warm-up power on phase, a video source from the connected electronic processing device is in control of said at least one piece of the one or more pieces of audio-visual presentation equipment, a video source from the connected electronic processing device is not in control of said at least one piece of the one or more pieces of audio-visual presentation equipment, and a button has been pressed but no video source from the connected electronic processing device is present.

Additional aspects and advantages of the embodiments will be set forth in part in the description which follows and, in part, will be obvious from the description, or may be learned by practice of the embodiments.

BRIEF DESCRIPTION OF THE DRAWINGS

The accompanying figures further illustrate the different embodiments.

The components in the drawings are not necessarily drawn to scale, emphasis instead being placed upon clearly illustrating the principles of the present invention. In the drawings, like reference numerals designate corresponding parts throughout the several views.

BRIEF DESCRIPTION OF THE SEVERAL VIEWS OF THE DRAWINGS

These and other aspects and advantages of the embodiments will become apparent and more readily appreciated from the following description of the different embodiments, taken in conjunction with the accompanying drawings.

Figure 1:
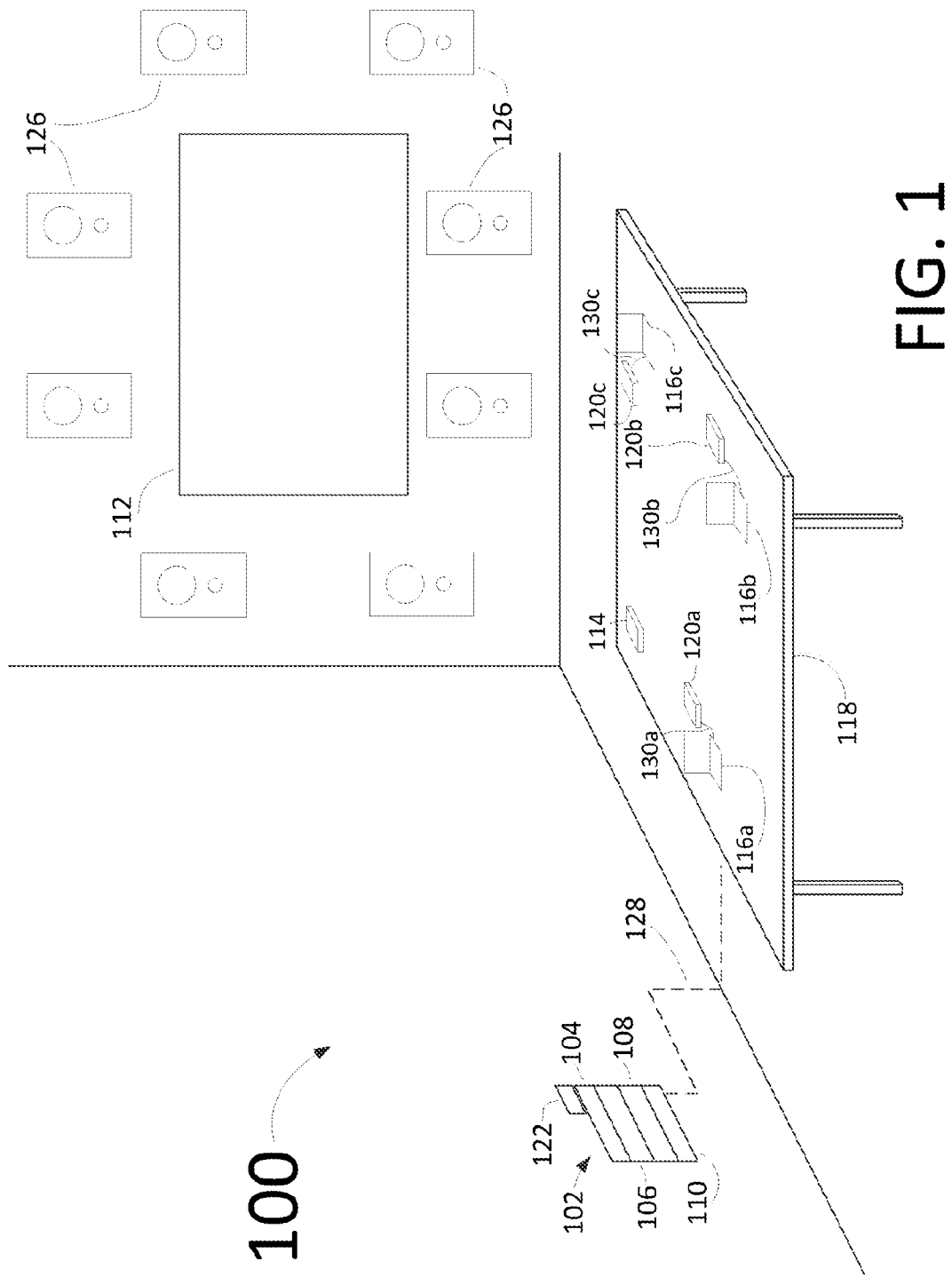
Figure 2:
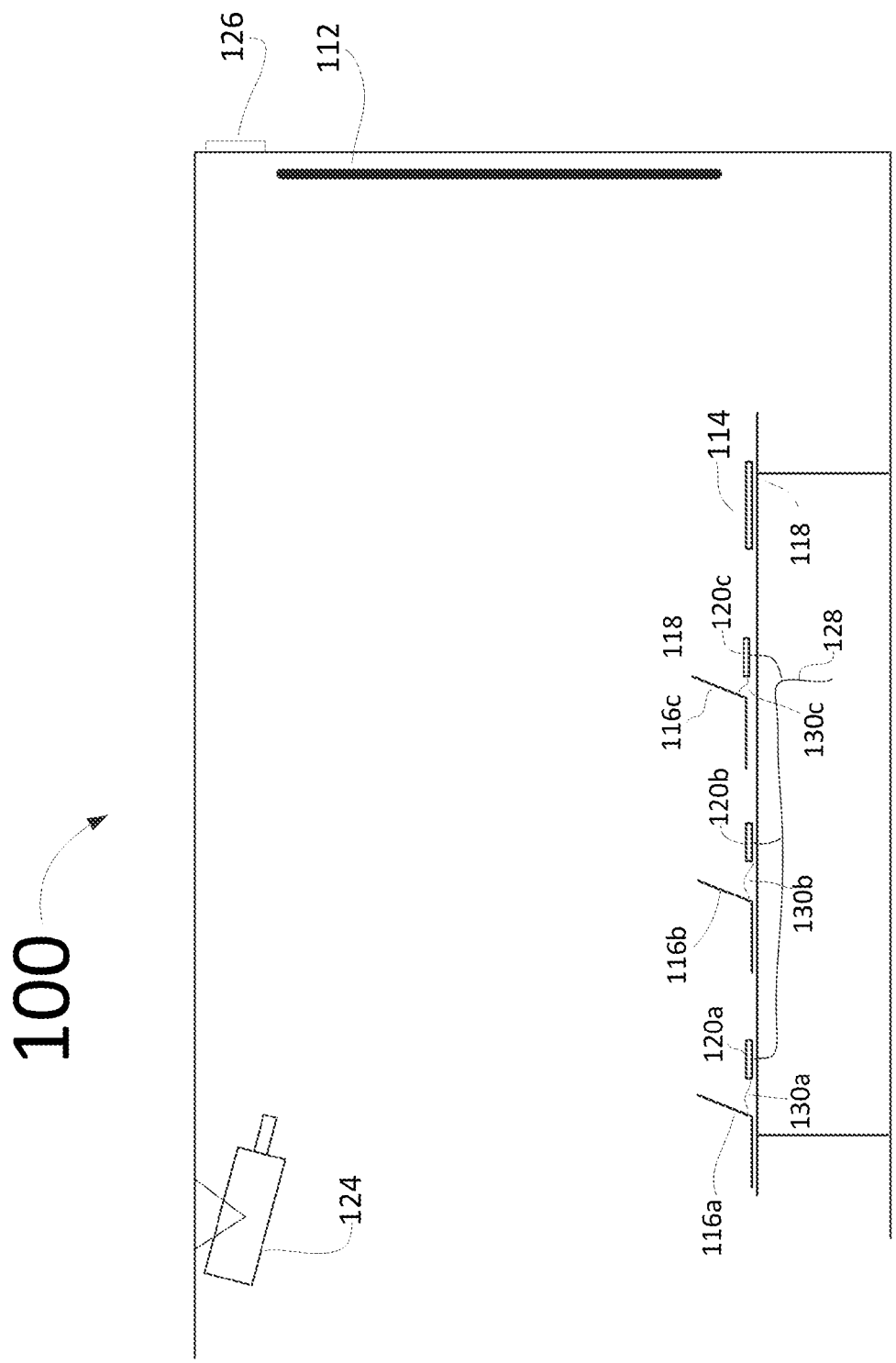

FIGS. 1 and 2 illustrate views of a conventional conference room with A/V devices that can generally be found in convention conference rooms in corporations in the U.S., among other places.

Figure 3:
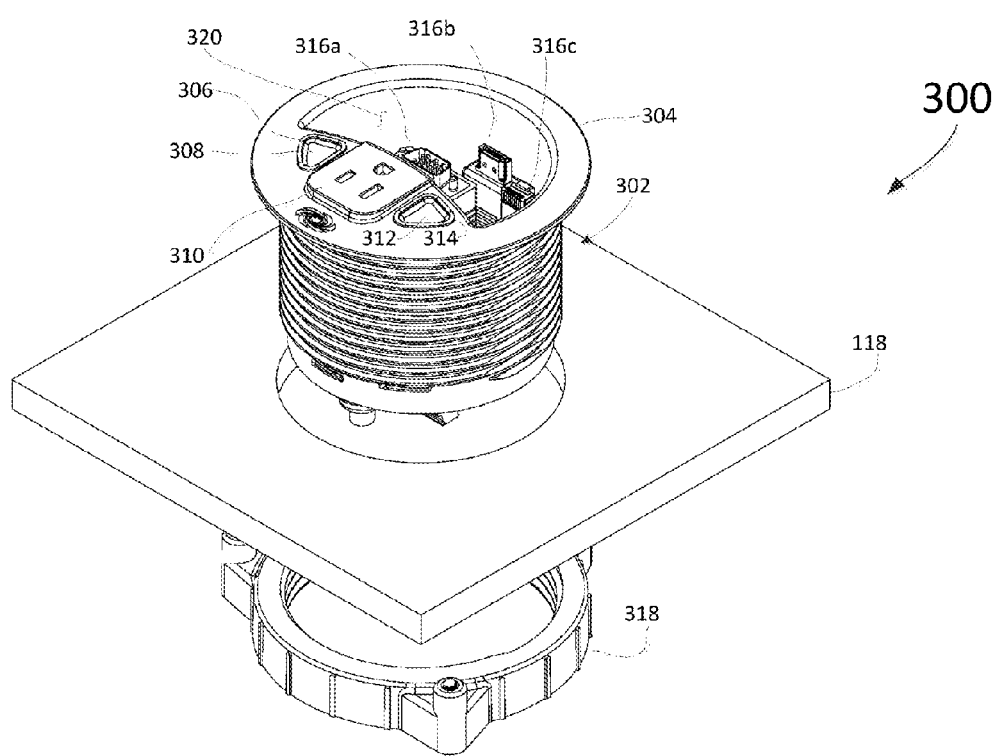

FIG. 3 illustrates a perspective view of a cable management hub located on a section of a conference table according to an embodiment.

Figure 4:
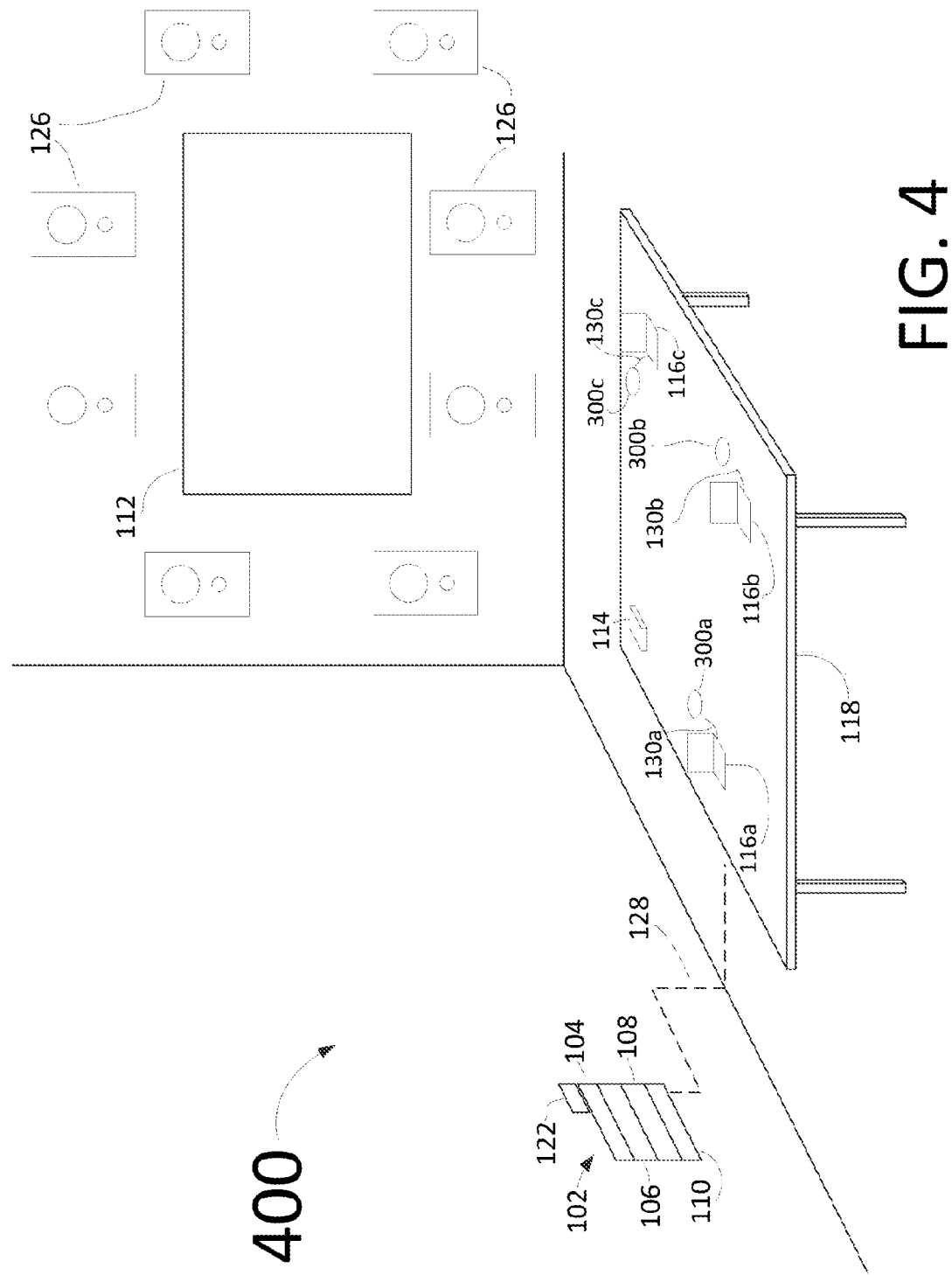

FIG. 4 illustrates a cable management hub in a perspective view of a conference room setting with an A/V system according to an embodiment.

Figure 5:
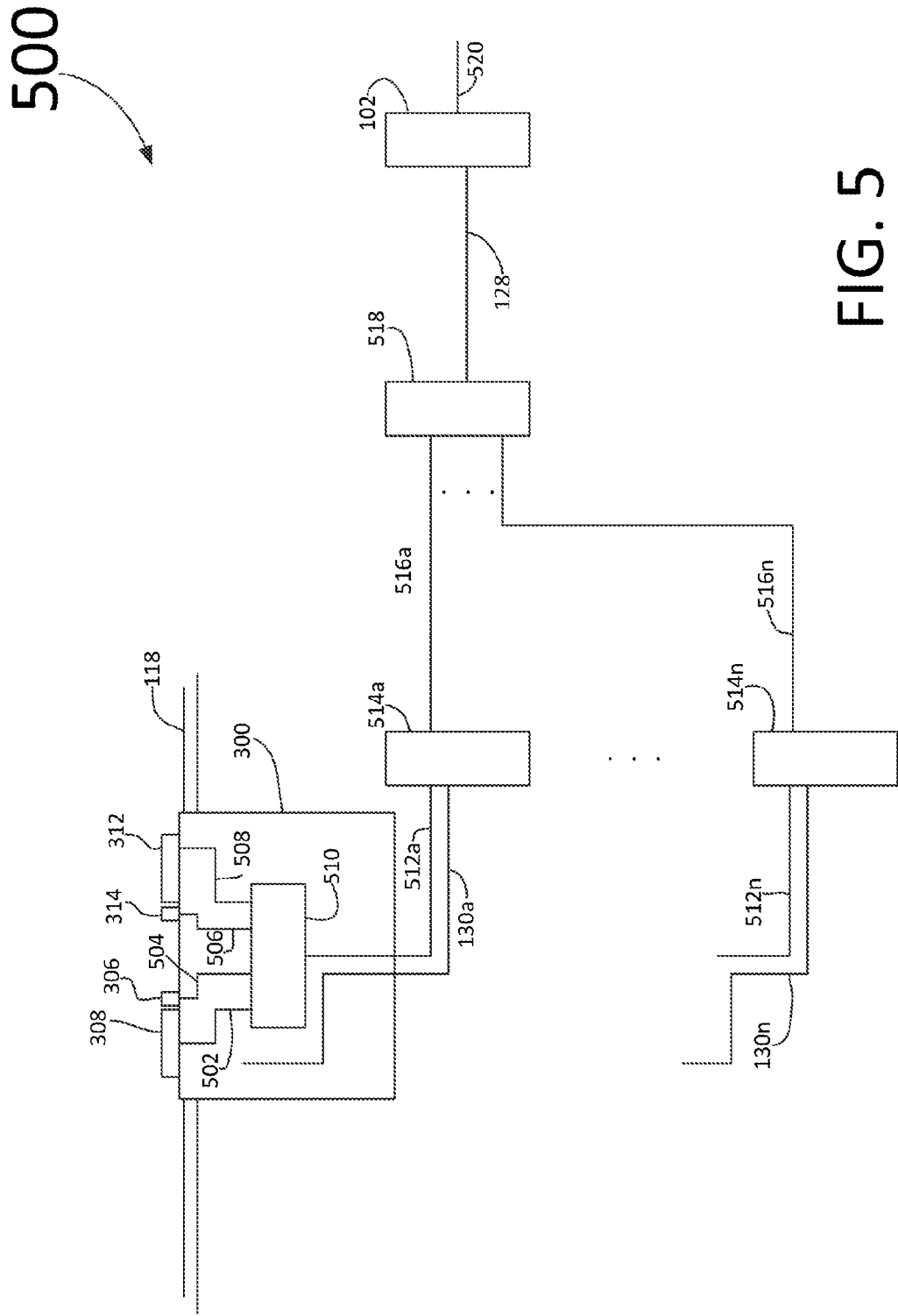

FIG. 5 illustrates a cable management system using the cable management hub shown in FIG. 4 for accessing and manipulating conference room A/V systems by portable devices according to an embodiment.

Figure 6:
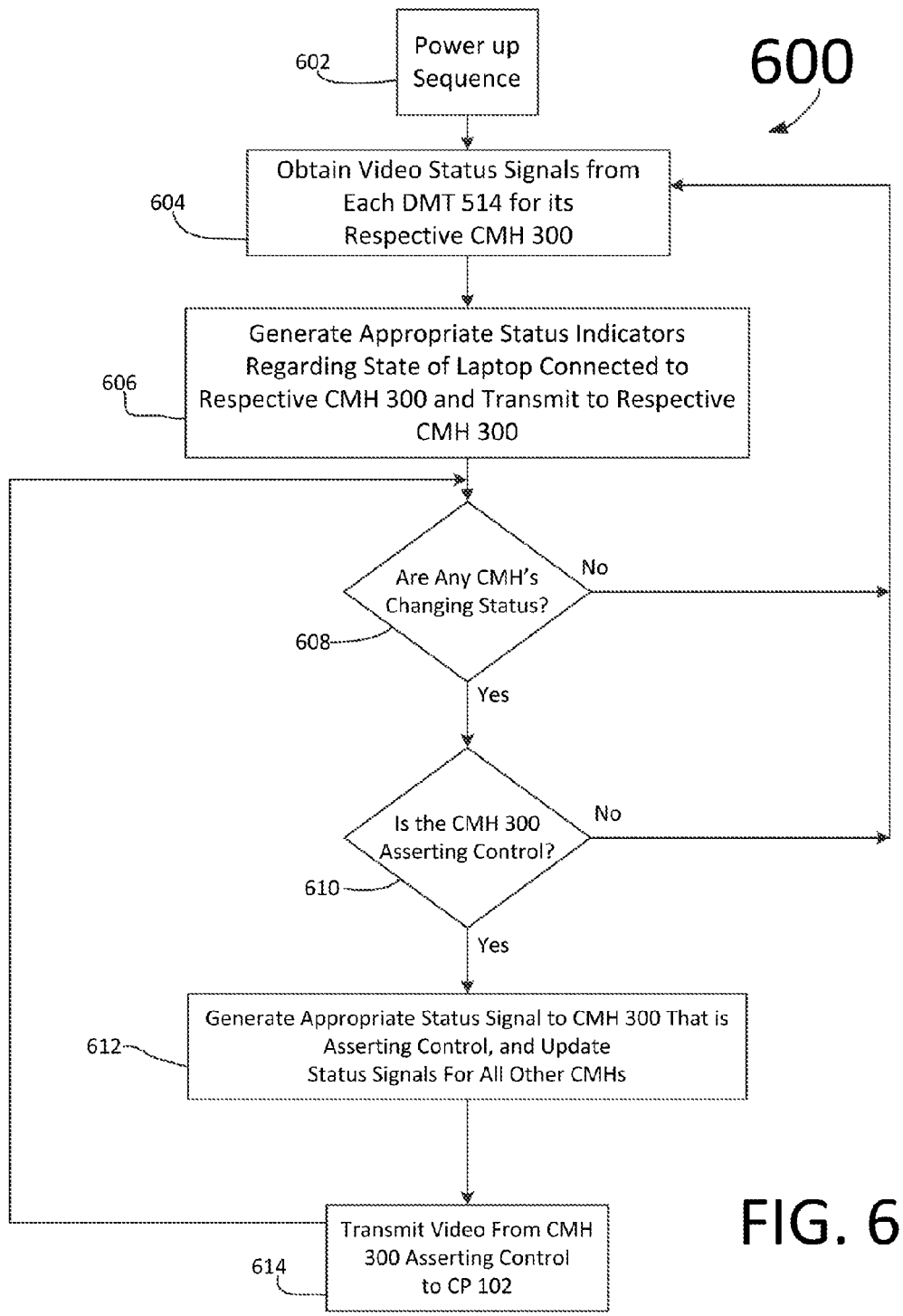

FIG. 6 illustrates a flowchart of a method of operating the cable management system of FIG. 5 according to an embodiment.

FIGS. 7-12 illustrate different perspective and planar views of the cable management hub of FIG. 4 according to an embodiment.

LIST OF REFERENCE NUMBER FOR THE MAJOR ELEMENTS IN THE DRAWINGS

102 Integrated Audio/Video Control Panel
104 Blu-Ray Video Disk Player
106 Amplifier
108 VCR/DVD Player (Video Cassette Recorder; Digital Video Disk)
110 Lighting Control
112 Liquid Crystal Display (LCD) Panel
114 Speaker Phone
116 Laptop
118 Conference Table
120 Laptop-Control Panel Interface Box
122 Wireless Gateway
124 Ceiling Mounted Projector
126 Speakers
128 CP Interface—CP Cable
130 Laptop—CP Interface Cable
300 Cable Management Hub (CMH)
302 CMH Main Assembly
304 Mounting Collar
306 First Button Indicator (LEDs)
308 First Capacitive Button (first button)
310 Power Connector
312 Second Capacitive Button (second button)
314 Second Button Indicator (LEDs)
316 Electronic Device Cable Connectors ($1^{st}$-$n^{th}$)
318 Tightening Collar
320 Hub Well
500 Cable Management System
502 First Button to Hub Circuitry Line
504 First Indicator to Hub Circuitry Line
506 Second Indicator to Hub Circuitry Line
508 Second Button to Hub Circuitry Line
510 Hub Circuitry
512 Hub Circuitry to Digital Media Transmitter (DMT) cable
514 Digital Media Transmitter
516 DMT to Digital Media Switch Cable
518 Digital Media Switch (DMS)
520 Cables to Conference Room Devices (from CP 102)
802 Hub Cover
1002 Hub—Button Interconnect Plate
1004 120 VAC Power Cable Through-hole
1006 4 Pin Connector
1008 USB Type Mini-AB Connector

DETAILED DESCRIPTION OF THE INVENTION

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to." The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The detailed description that follows is written from the point of view of a control systems company, so it is to be understood that generally the concepts discussed herein are applicable to various subsystems and not limited to only a particular controlled device or class of devices, such as cable management systems for use with A/V equipment in conference or meeting rooms.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

MODE(S) FOR CARRYING OUT THE INVENTION

The different aspects of the embodiments described herein pertain to the context of cable management and interactive control electronics to facilitate interconnection of portable electronic devices to an A/V control system in a conference room, but is not limited thereto, except as may be set forth expressly in the appended claims. According to different aspects of the embodiments, described in greater detail below, a cable management hub is provided that includes one or more buttons, indicators, and cables. The cable management hub provides an interface between a user's electronic processing device through the cables of the cable management hub. The electronic processing device is generally a laptop, but not necessarily limited thereto, that can use software applications stored thereupon to generate audio-visual signals that can be used by the audio-visual presentation equipment present in, for example, a conference room, to be displayed or presented. Since there can be multiple users of the audio-visual equipment in the conference room, it is not always clear who is generating the audio-visual data that is being presented and displayed on, for example, a large LED panel. Pressing one of the buttons on the cable management hub allows a user to assert control over the audio-visual equipment, so that user's signals can be displayed on the panel (or other signals presented, dependent on the type of signal); the indicators can show (by illuminating) which user is in control to all of the other users, or occupants in the room, and also can indicate other status conditions.

FIG. 3 illustrates a perspective view of cable management hub (CMH) 300 on a section of conference table 118 according to an embodiment. Shown in FIG. 3 is CMH 300 that includes first and second capacitive buttons 308, 314. As those of skill in the art can appreciate, capacitive sensing is a technology based on capacitive coupling, which takes human body capacitance as input. Capacitive sensors detect anything that is conductive or has a dielectric different from that of air. As further can be appreciated by those of skill in the art, first and second buttons 308, 314, do not necessarily need to be capacitive buttons; other technologies for buttons work equally as well. But, in fulfillment of the dual purposes of clarity and brevity, buttons 308, 314 will be from heron in referred to only as capacitive buttons.

CMH 300 further includes indicators 306, 312, one each for buttons 308, 314, respectively. According to further aspects of the embodiments, indicators 306, 312 are LEDs, and can be illuminated in different colors, and different lighting patterns to indicate different actions, which can be seen by other users or occupants to note certain status conditions, or who is controlling the audio-visual presentation equipment. These actions will be discussed in greater detail below. As those of skill in the art can appreciate, the indicators are not limited to LED based technologies, as other types of indicators can also be used herein. Further shown in FIG. 3 are laptop 116 cable connectors 316a-c. As those of skill in the art can appreciate, there need not be three connectors in CMH 300, as there can be none, one, or any number that can be engineered into the footprint of CMH 300 according to an embodiment. However, as those of skill in the art can appreciate, certain connector types of fairly ubiquitously used in the laptop industry: these would include universal serial bus (USB) cable connectors, Ethernet cable connectors, and high definition multimedia interface (HDMI) cable connectors, "regular" video 9 pin cable connectors, among others, collectively shown as 316a-c. Also part of CMH 300 is 120 VAC power connector 310.

CMH 300, as shown in FIG. 3 (and others) is generally circular in shape, which makes installation relatively easy into conference table 118. That is, a hole-saw of the appropriate diameter can be used to drill a hole through the top of table 118, and CMH main assembly 302 can be placed therein, with mounting collar 304 resting on an upper surface of table 118. Then, tightening collar 318 can be screwed onto CMH main assembly 302 on the threads as shown, from below the upper surface of table 118, to securely fit CMH main assembly 302 to table 118. The cables (some of which have already been described, and some of which are described in greater detail below), can then be inserted into CMH main assembly 302 (through a grommet, cable clamps, or other similar means), and then connected to first and second buttons 308, 312, first and second indicators 306, 310, and 120 VAC power connector 310.

FIG. 4 illustrates use of cable management hub 300 in a perspective view of conference room 400 with an A/V system according to an embodiment. Similarly to the environment of FIGS. 1 and 2, conference room 400 includes many of the same devices, including display screen 112, table 118, speaker phone 114, laptop-control panel interface box 120, and A/V panel 102. A/V panel 102 includes Blu-Ray video disk player 104, amplifier 106, video cassette recorder and digital video disk (VCR/DVD) player 108, and lighting control 110. Located near, or part of CP 102, is wireless gateway 122, which can receive wireless signals according to the one or more wireless protocol(s) in use, and control one or more of the devices within CP 102. Connecting CP 102 to CMH 300 is CP cable 128, and laptop 116 is connected to CMH 300 CP interface cable 130. However, as further shown in FIG. 5, CP interface cable 130 connects to other circuitry before the signals carried therein are carried to CP 102.

CP 102, and one or more of the devices contained therein, are connected to ceiling mounted projector 124 that can display video, photos, or computer-generated images. CP 102, and one or more of the devices connected therein, are also connected to speakers 126, for projecting audio associated with teleconferences, videos, or computer generated videos, among other sources of audio information.

FIG. 5 illustrates cable management system (CMS) 500 using CMH 300 for accessing and manipulating A/V systems within conference room 400 by laptops 116 (among other processing electronic devices), and for indicating which laptop 116 has control of CP 102 according to an embodiment, and FIG. 6 illustrates a flowchart of method 600 for operating CMS 500 of FIG. 5 according to an embodiment. Operation of CMS 500 will be discussed in the context of method 600 shown in FIG. 6, though those of skill in the art can appreciate that use and operation of CMS 500 is not limited to any particular order of steps of method 600, nor is use of CMS 500 limited to method 600 in any form.

CMS 500 includes CMH 300, which is shown to include hub circuitry 510, and lines 502, 504, 506, and 508, which connect first button 308, first indicator 310, second indicator 312, second button 314 to hub circuitry 510, respectively. Hub circuitry 510 is connected to digital media transmitter (DMT) 514, but as those of skill in the art can appreciate, hub circuitry 510 can itself be part of DMT 514, and the respective lines 502, 504, 506 and 508 can be connected to DMT 514, without any loss of functionality of either device. Furthermore, DMT 514 and digital media switch 518 (discussed in greater detail below), whether taken alone or in combination, encompass additional functions than what is described in conjunction with CMH 300 according to further embodiments.

According to an embodiment, hub circuitry 510 contains circuitry that receives signals from first and second buttons 308, 312, processes them (i.e., performs a de-bounce process, and/or translates them to a different signal level, and/or makes them differential, among other processing techniques, all of which can be considered to be incorporated into the different aspects of the embodiments), and transmits them to DMT 514a, which then integrates them (and other signals, such as the video signals output from laptops 116) onto cable 516a to be transmitted to DMS 518. The process of receiving the signals from hub circuitry 510, processing them (as described above), and then transmitting them to DMS 518 by DMT 514*a* is known to those of skill in the art, and therefore since the aspects of the embodiments can be understood without a detailed discussion thereof, it will be omitted in fulfillment of the dual purposes of clarity and brevity. It can be appreciated by those of skill in the art that there can be multiple CMHs 300 within a typical conference room environment, each with a respective DMT 514, all of which are connected to one or more DMSs 518. While there may be a practical limit as to the number of CMHs 300/DMTs 514 that can be connected to a single DMS 518, according to further aspects of the embodiments, there is no fixed number, as the DMS 518 could, in theory, be made ever larger to accommodate an increasing number of CMHs 300—DMTs 514 pairs.

According to an embodiment, DMS 518 receives the signals generated by first and second buttons 308, 312, and processes and acts upon them in the following manner. As described above, in a typical scenario, one or more plurality of users of CMS 500 would be using laptops 116 that contain one or more applications that can generate one or more signal types that contain the information of the one or more applications. These signals may contain data, audio, video, or any combination thereof transmitted over one or more known signal types, including but not limited to USB, HDMI, RS232 type transmissions, that can be used by one or more of the devices located within CP 102, according to known system and methods. What is lacking in prior art systems, however, is a way of indicating who has control of CP 102, i.e., who is generating and transmitting the data being displayed, and how is transfer of control managed in an orderly manner, and conveyed to other users/occupants of the conference room.

DMS 518 monitors all of the respective signals from first and second buttons 308, 312, from each of the one or more CMHs 300. Once a user presses either of first and second buttons 308, 312 (the buttons are redundant; i.e., they both work substantially similarly), that user is attempting to gain control of CP 102 in order to put that user's data into the system controlled by CP 102. DMS 518, if already processing data from a previous user, will cause an alert condition to be displayed on first and second indicators 306, 314 on the particular CMH 300 of the user that pressed either of first and second buttons 308, 312. The alert will let everyone in the conference room around table 118 that this user is attempting to gain control of the data throughput into CP 102. Once DMS 518 completes processing of the existing parcel of data within its memory, it will signal all of the users of CMS 500 that control is now being diverted to the user that pressed one of first and second buttons 308, 312, and the data that was being received from a respective DMT 514*a*, but which was being ignored, will now start to be transmitted to CP 102 via cable 128. The alerts can be generated by additional circuitry located within DMS 518, and is transmitted to DMT 514*a* via cable 516*a*, and then to CMH 300 and hub circuitry 510, as described below. The description above of the operation of CMS 500 according to an embodiment was provided as a summary of the method of operation. Discussed below is method 600, which describes in greater detail how CMS 500 operates.

Method 600 begins with step 602, wherein all of the components of CMS 500 are powered up, or have achieved power-up status. In step 604, DMS 518 receives video signals from each DMT 514 for its respective CMH 300, and laptop 116. Then, in method step 606, DMS 518 generates status signals responsive to the to be transmitted to each DMT 514 and CMH 300, that indicates the status of laptop 116 attached to CMH 300. At this point, it is presumed that no laptop 116 is generating video signals (according to an embodiment, "video" signals also includes accompanying audio/data signals), though that need not be the case. There are several status signals that can be determined at this point. The first is status signal (a), which represents that the no video source is connected at the particular CMH 300. Hub circuitry 510 receives this status signal from DMS 518 and generates the appropriate drive signals to illuminate indicators 306, 314 as a solid blue light. As noted above, indicators 306, 314 are generally available to be readily visible by all the occupants of the room, or other users, so that any indication of a status is readily visible and ascertainable by others. As those of skill in the art can appreciate, hub circuitry 510 does not necessarily have to be located within CMH 300, but that according to an embodiment, as it can be located with DMT 514, or even as part of the circuitry that is part of DMS 518. Nonetheless, for the purposes of making the discussion relatively easier to understand, the different aspects of the embodiments are being described as being located in different components of CMS 500.

Another status signal that can be generated at this point is status signal (b), which represents that a video source from laptop 116 is connected to its respective CMH 300, and display device 112 is powering up. To indicate that status (b) is present, DMS 518 will generate a signal that causes indicators 306, 314 to be green and blinking at the appropriate CMH 300.

A third status signal that can now be generated (recalling that no laptop 116 is actually broadcasting or generating video), is status signal (c), which represents that a video source is connected at the particular CMH 300, but not currently selected for viewing by DMS 518. Hub circuitry 510 receives this status signal from DMS 518 and generates the appropriate drive signals to illuminate indicators 306, 314 as a slowly pulsing green light. Thus, according to embodiments, if there were, by way of non-limiting example, ten participants in a conference, at table 118, and everyone had their own laptops, plugged into CMH 300, but no one had their Microsoft PowerPoint® presentations up and running at this time, then status (c) would be present, and DMS 518 would cause all of the CMHs 300 to show slowly blinking green LED indicators 306, 314.

Following generation of the appropriate status indicators by DMS 518 for all the CMHs 300 that had laptops attached to them, method 600 proceeds to step 608 wherein it begins to monitor whether any of the CMHs 300 are changing their status: that is, is a video source now connected where before the source was not connected (status (b)), or conversely, has a user of a certain laptop 116 disconnected a video source that once was connected (status (a)). If no changes in any of the statuses of CMHs 300 are indicated, then method 600 continues to monitor the signals from the one or more DMTs 514 ("No" path from decision step 608). If, however, a change in status is indicated ("Yes" path from decision step 608), then method 600 proceeds to determine if the change in status is one laptop 116 asserting control over the video being displayed on panel 112. That is, if a particular CMH 300 asserts control ("Yes" path from decision step 610), then one or other of first and second buttons 308, 312 has been pushed, and DMT 514 has transmitted that signal to DMS 514, which recognizes it as such. In method step 612, an appropriate status signal is generated to the appropriate CMH 300, and status (d) is generated for that particular CMH 300, in which both indicators 306, 314 are illuminated as a solid (non-blinking) green illumination. All the rest of the CMHs 300 that are part of CMS 500 with laptops 116 connected thereto will indicate status (c) in which both indicators 306, 314 of the other CMHs 300 are illuminated as a slowly blinking green illumination. If, however, a user presses one of the buttons 308, 312, but has no video source connected to CMH 300, then status (e) is present at that particular CMH 300, and DMS 318 will generate signal that causes a red light to be illuminated on indicators 306, 314, blinking five times slowly.

According to an embodiment, in method 600, step 614 then follows wherein video present at the CMH 300 in which one or more of first and second connect buttons 308, 312 was pushed is connected to and through DMS 518, and sent to CP 102 via cable 128. Method 600 then returns to decision step 608 to determine if there is a change in status of any of the CMHs 300. Method 600 continually monitors outputs from all of CMHs 300 unless/until a status change is determined to have occurred (following decision step 608, method 600 returns to steps 604, 606). As shown in FIG. 6, method 600 first returns to step 604, if there is no status change, or performs steps 610-614 if there is a status change (with steps 612 and 614 reserved for changing control of CMS 500 according to an embodiment).

Figure 7:
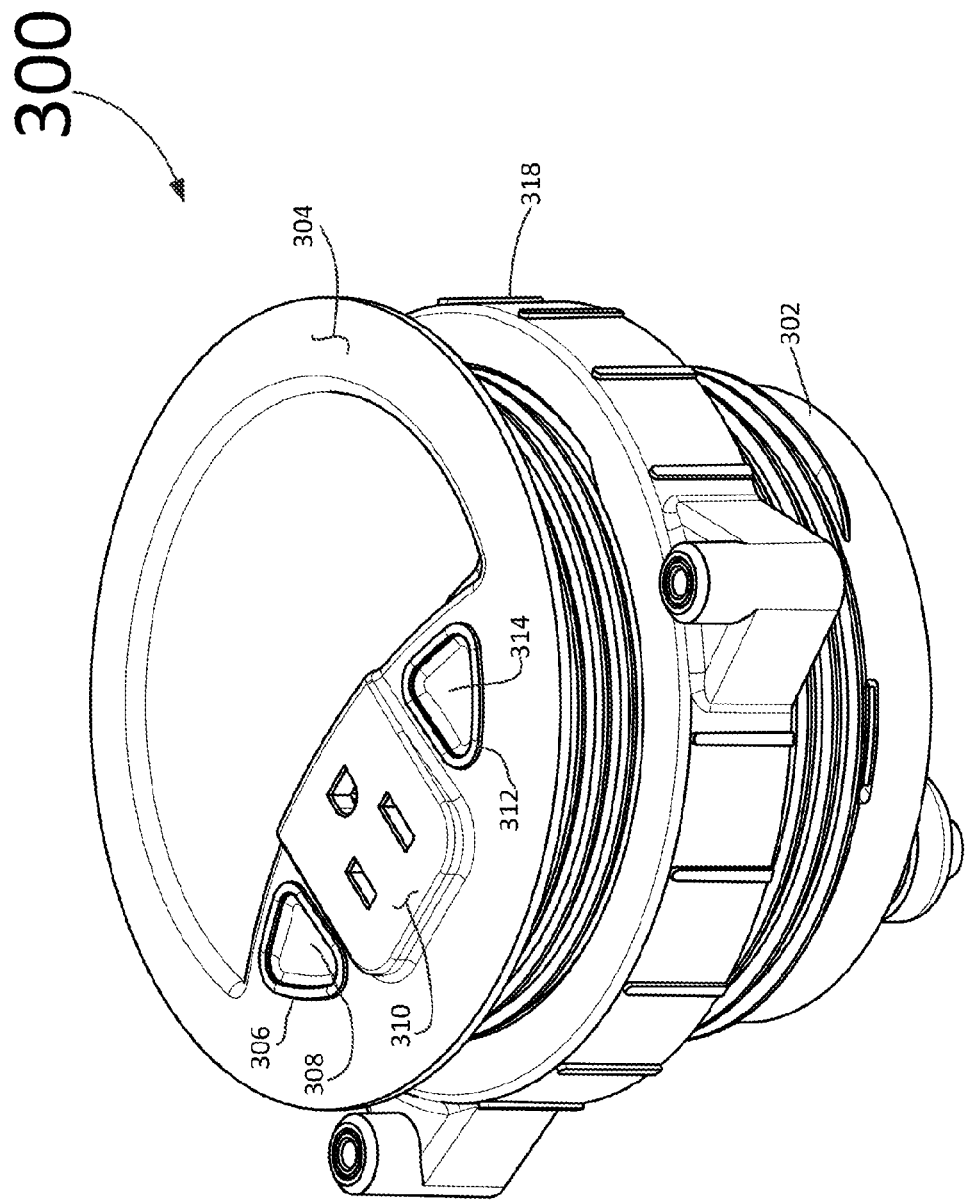
Figure 8:
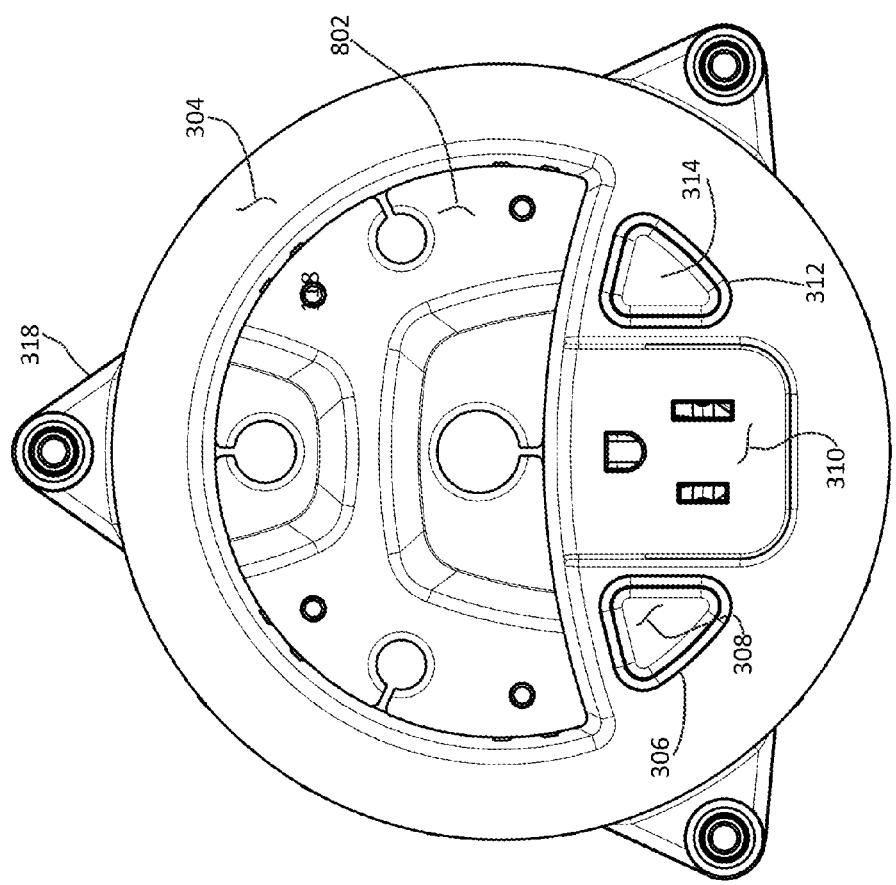
Figure 9:
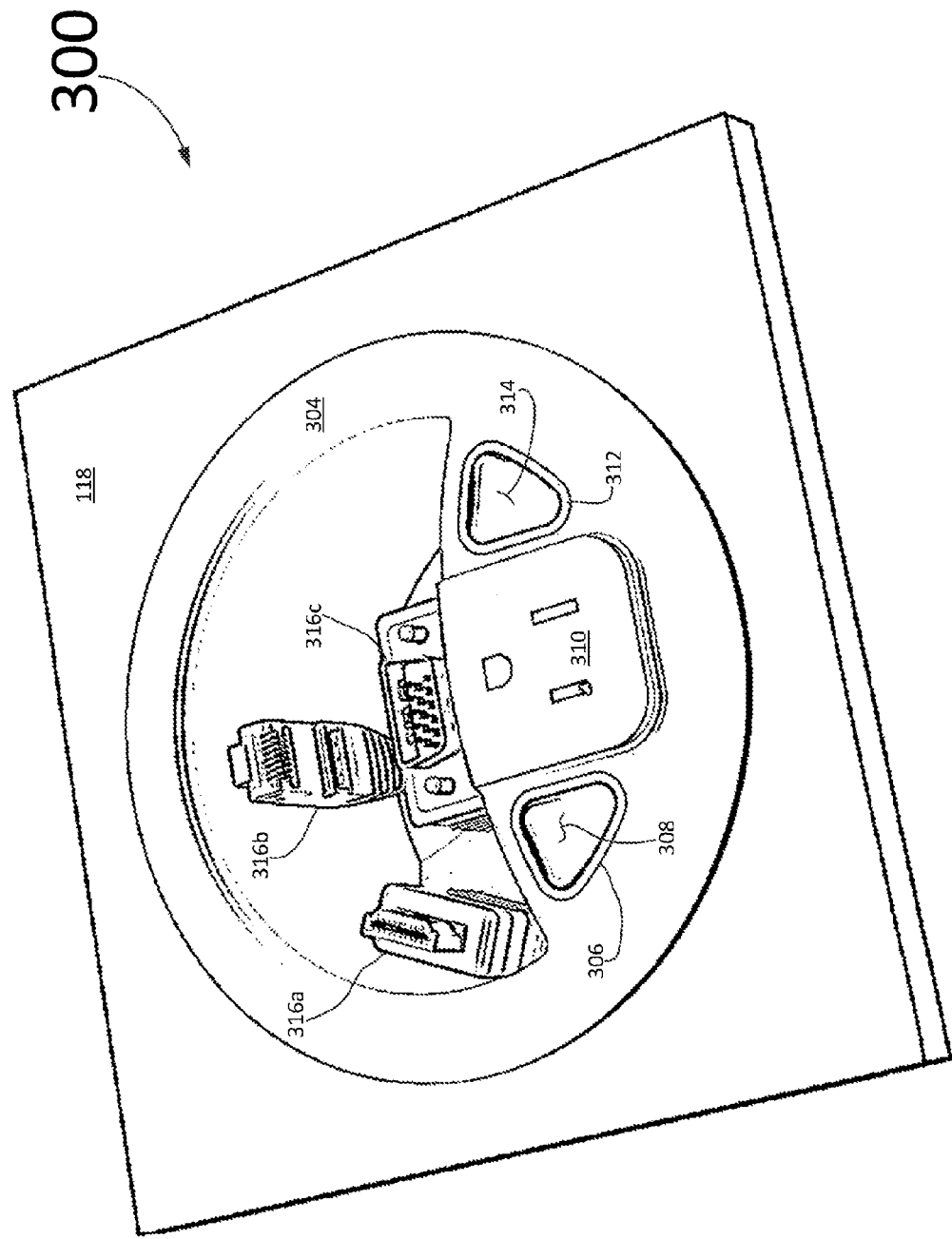
Figure 10:
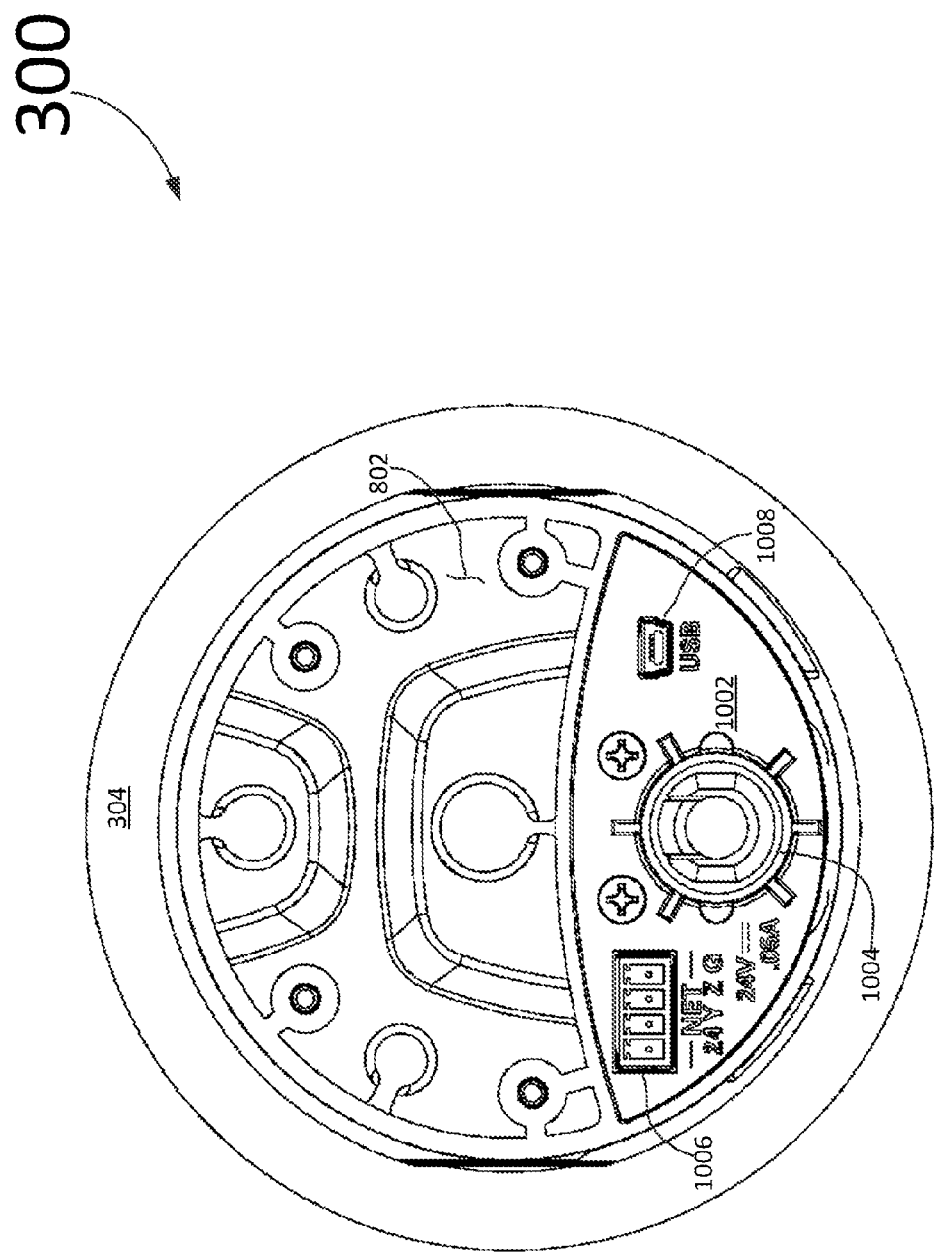
Figure 11:
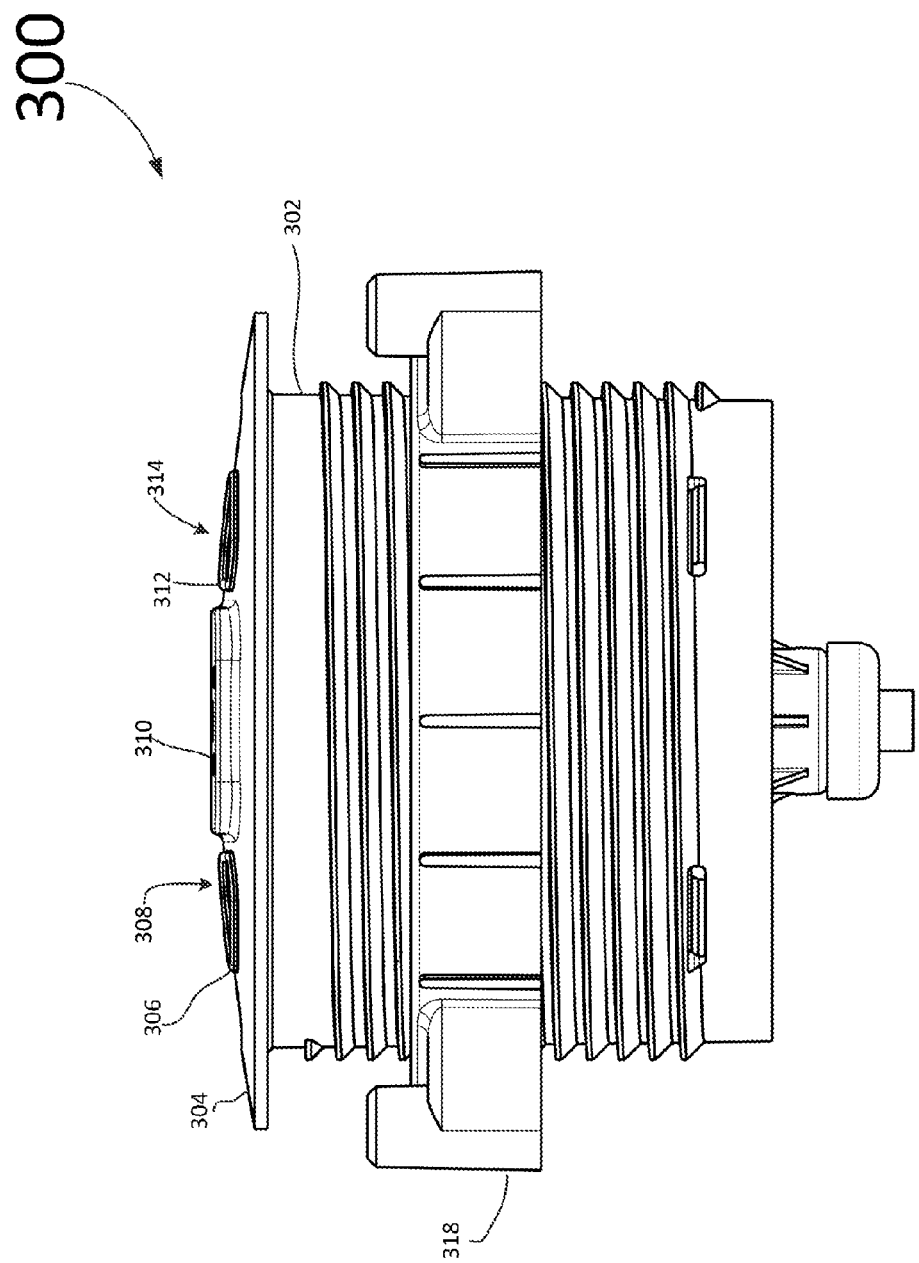
Figure 12:
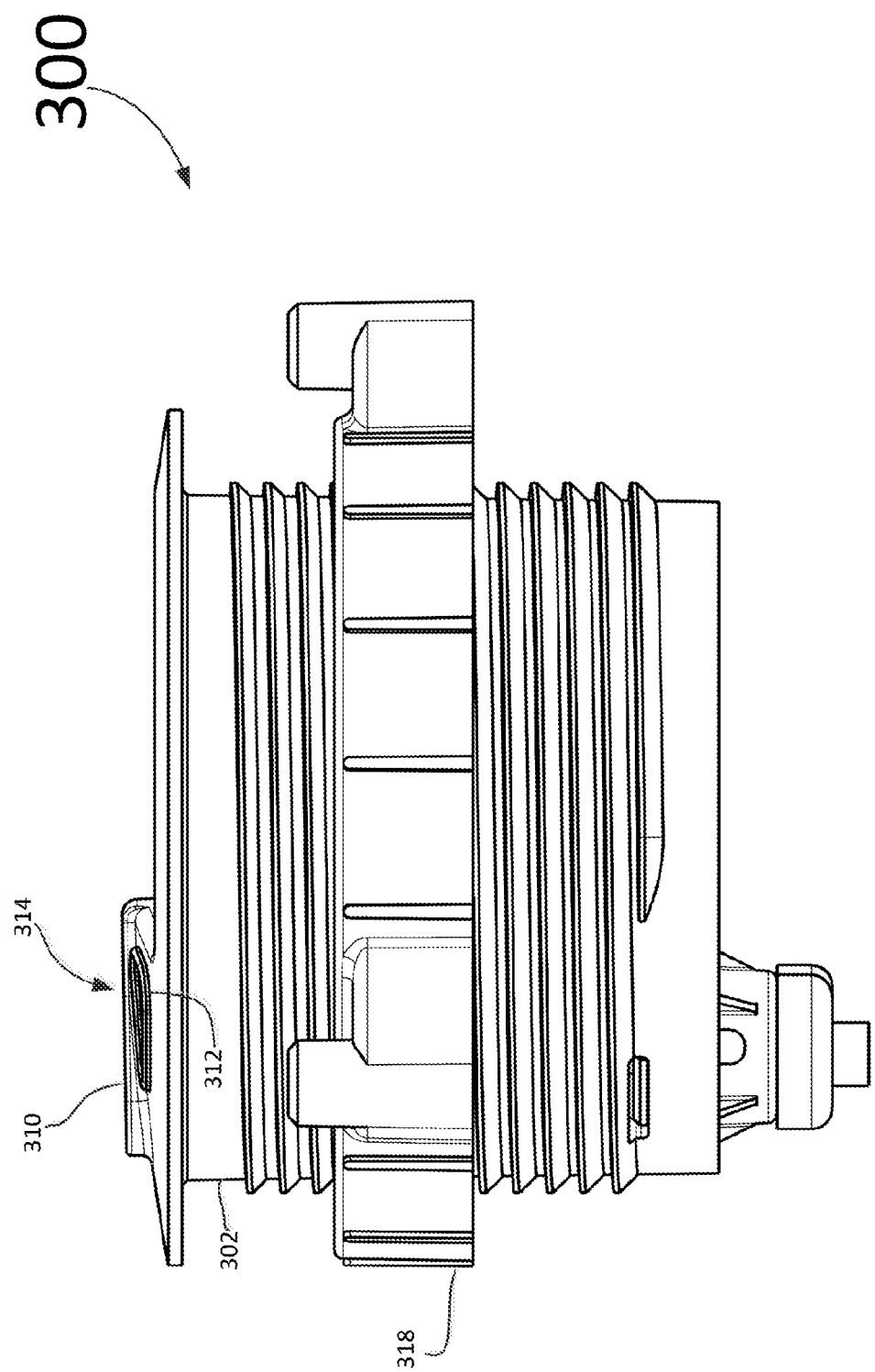

FIGS. 7-12 illustrate different perspective and planar views of CMH 300 for use in CMS 500 according to an embodiment. FIG. 7 is a top perspective view of CMH 300; FIG. 8 is a top planar view of CMH 300 (showing hub cover 802 according to an embodiment); FIG. 9 is another top perspective view of CMH 300 more clearly illustrating connectors 316*a-c*; FIG. 10 is a top planar view of CMH 300 but with a top plate missing, more clearly illustrating hub button interconnect plate 1002, 120 AC power cable through-hole 1004, 4 pin connector 1006, and USB type mini-AB connector 1008; FIG. 11 is a first side view of CMH 300; and FIG. 12 is a second side vie of CMH 300, according to an embodiment.

LIST OF ACRONYMS USED IN DETAILED
DESCRIPTION OF THE INVENTION

A/V Audio/Visual
BT Blue Tooth
CMH Cable Management Hub
CP Control Panel
DMS Digital Media Switch
DMT Digital Media Transmitter
DVD Digital Video Disk
HDMI High Data Multimedia Interface
LCD Liquid Crystal Display
LED Light Emitting Diode
NFC Near Field Communication
UL Underwriter's Laboratory
USB Universal Serial Bus
VCR Video Cassette Recorder

ALTERNATE EMBODIMENTS

Alternate embodiments may be devised without departing from the spirit or the scope of the invention.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives.

The disclosed embodiments provide a system, software, and a method for controlling and conveying who is in control of an A/V system for use, by way of a non-limiting example, in a conference room. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

All United States patents and applications, foreign patents, and publications discussed above are hereby incorporated herein by reference in their entireties.

What is claimed is:

1. A cable management hub for use in providing an interface between one or more pieces of audio-visual presentation equipment and an electronic processing device configured to generate one or more electrical signals that can connect to and cause at least one of an audio presentation and a visual presentation to be presented on said one or more pieces of audio-visual presentation equipment, the cable management hub comprising:

a first portion that includes one or more cables each with a respective cable connectors that are configured to mate with a respective cable from the electronic processing device and to carry respective electrical signals from the electronic processing device to the one or more pieces of audio-visual presentation equipment through the respective one or more cables;

one or more buttons, each of which is configured to generate an electrical signal when pressed by a user of the electronic processing device that indicates a desire by the user to transfer control of the one or more pieces of audio-visual presentation equipment from the electronic processing device of a previous user of the one or more pieces of audio-visual presentation equipment should said control situation exist to the electronic processing device of the user that pressed a respective one of the one or more buttons, or to initiate control of the one or more pieces of audio-visual presentation equipment should said control situation not exist; and one or more illuminated indicators configured to illuminate in a manner indicative of a received status condition signal.

2. The cable management hub according to claim 1, further comprising:
a hub circuit configured to receive and then process the one or more button generated electrical signals, and transmit the processed button generated electrical signals to a central device.

3. The cable management hub according to claim 2, wherein
said hub circuit is further configured to receive said status condition signal from said central device and transmit said status condition signal to said one or more illuminated indicators, causing said one or more illuminated indicators to illuminate in a manner according to the received status condition signal.

4. The cable management hub according to claim 1, wherein
said status condition signal indicates a status condition of the one or more pieces of audio visual equipment and attached electronic processing device, wherein said status condition includes at least an indication of said control situation.

5. The cable management hub according to claim 1, wherein
said status condition signal conveys information regarding at least one of a lack of video source from the connected electronic processing device,
a video source is connected from the connected electronic processing device and a visual presentation piece of equipment is in a warm-up power on phase,
a video source from the connected electronic processing device is in control of said at least one piece of the one or more pieces of audio-visual presentation equipment,
a video source from the connected electronic processing device is not in control of said at least one piece of the one or more pieces of audio-visual presentation equipment, and
a button has been pressed but no video source from the connected electronic processing device is present.

6. The cable management hub according to claim 1, wherein
the cable management hub can be used on a table in a conference room, and wherein the cable management hub further includes
a container portion that extends through a hole in the table, from above an upper surface of the table to below a lower surface of the table, and wherein the container portion includes a recessed area, and the recessed area includes the one or more cable connectors.

7. The cable management hub according to claim 6, further comprising:
a substantially planar upper portion that is part of an upper portion of the container portion and resides upon an upper surface of the table, and upon which resides the one or more buttons and illuminated indicators.

8. An audio-visual equipment management system comprising:
at least one electronic processing device;
one or more pieces of audio-visual presentation equipment;
a central device electrically connected to both the at least one electronic processing device and the one or more pieces of audio-visual presentation equipment, and wherein the central device is configured to provide at least one of audio signals and video signals from the at least one electronic processing device to the one or more pieces of audio-visual presentation equipment; and
a cable management hub positioned between the at least one electronic processing devices and the central device, and wherein the cable management hub includes
one or more buttons, each of which is configured to generate an electrical signal when pressed by a user of the electronic processing device that indicates a desire by the user to transfer control of the one or more pieces of audio-visual presentation equipment from the electronic processing device of a previous user of the one or more pieces of audio-visual presentation equipment should said control situation exist, to the electronic processing device of the user that pressed a respective one of the one or more buttons, or to initiate control of the one or more pieces of audio-visual presentation equipment should said control situation not exist, and
one or more illuminated indicators configured to illuminate in a manner indicative of a received status condition signal.

9. The audio-visual equipment management system according to claim 8, wherein said cable management hub further comprises:
a hub circuit configured to receive and then process the one or more button generated electrical signals, and transmit the processed button generated electrical signals to the central device.

10. The audio-visual equipment management system according to claim 9, wherein
said hub circuit is further configured to receive said status condition signal from said central device and transmit said status condition signal to said one or more illuminated indicators, causing said one or more illuminated indicators to illuminate in a manner according to the received status condition signal.

11. The audio-visual equipment management system according to claim 8, wherein
said status condition signal indicates a status condition of the one or more pieces of audio visual equipment and attached electronic processing device, wherein said status condition includes at least an indication of said control situation.

12. The audio-visual equipment management system according to claim 8, wherein said status condition signal conveys information regarding at least one of
a lack of video source from the connected electronic processing device,
a video source is connected from the connected electronic processing device and a visual presentation piece of equipment is in a warm-up power on phase,
a video source from the connected electronic processing device is in control of said at least one piece of the one or more pieces of audio-visual presentation equipment,
a video source from the connected electronic processing device is not in control of said at least one piece of the one or more pieces of audio-visual presentation equipment, and
a button has been pressed but no video source from the connected electronic processing device is present.

13. The audio-visual equipment management system according to claim 8, wherein
said cable management hub can be used on a table in a conference room, and wherein said cable management hub further includes
a container portion that includes one or more cables each with a respective cable connector that is configured to mate with a respective cable from said at least one electronic processing device and to carry respective electrical signals from said at least one electronic processing device to the one or more pieces of audio-visual presentation equipment through the respective one or more cables.

14. The audio-visual equipment management system according to claim 13, wherein said cable management hub further comprises:
a substantially planar upper portion that is part of an upper portion of the container portion and resides upon an upper surface of the table, and upon which resides the one or more buttons and illuminated indicators.

15. A method for controlling an audio-visual presentation equipment management system, the method comprising:
determining whether a user of said audio-visual presentation equipment management system has indicated a request to assume control of said audio-visual presentation equipment management system;
presenting at least one of an audio presentation and video presentation to said audio-visual presentation equipment management system if said user requesting control is ready to provide at least one of an audio presentation and video presentation to said audio-visual presentation equipment management system; and
causing an illuminated indicator to illuminate to provide an indication that said user is in control of said audio-visual presentation equipment management system, and wherein the step of determining comprises
receiving one or more user status signals at a central location;
determining a level of use and readiness for each of said users to use the audio-visual presentation equipment management system based on said received one or more user status signals; and
determining if any of said users of said audio-visual presentation equipment management system has transmitted said request to assume control of said audio-visual presentation equipment management system.

16. The method according to claim 15, wherein said one or more user status signals include
a lack of video source from the connected electronic processing device,
a video source is connected from the connected electronic processing device and a visual presentation piece of equipment is in a warm-up power on phase,
a video source from the connected electronic processing device is in control of said at least one piece of the one or more pieces of audio-visual presentation equipment,
a video source from the connected electronic processing device is not in control of said at least one piece of the one or more pieces of audio-visual presentation equipment, and
a button has been pressed but no video source from the connected electronic processing device is present.

17. A cable management hub comprising;
a first portion that includes one or more cables each with a respective cable connector that is configured to mate with a respective cable from an electronic processing device and to carry respective electrical signals from the electronic processing device to one or more pieces of audio-visual presentation equipment through the respective one or more cables;
one or more buttons, each of which is configured to generate an electrical signal when pressed by a user of the electronic processing device that indicates a desire by the user to transfer control of the one or more pieces of audio-visual presentation equipment from the electronic processing device of a previous user of the one or more pieces of audio-visual presentation equipment should said control situation exist to the electronic processing device of the user that pressed a respective one of the one or more buttons, or to initiate control of the one or more pieces of audio-visual presentation equipment should said control situation not exist;
one or more illuminated indicators configured to illuminate in a manner indicative of a received status condition signal; and
a hub circuit configured to receive and then process the one or more button generated electrical signals, and transmit the processed button generated electrical signals to a central device, and wherein said hub circuit is further configured to receive said status condition signal from said central device and transmit said status condition signal to said one or more illuminated indicators, causing said one or more illuminated indicators to illuminate in a manner according to the received status condition signal.

18. The cable management hub according to claim 17, wherein
said status condition signal indicates a status condition of the one or more pieces of audio visual equipment and attached electronic processing device, wherein said status condition includes at least an indication of said control situation.

19. The cable management hub according to claim 18, wherein
said status condition signal conveys information regarding at least one of
a lack of video source from the connected electronic processing device,
a video source is connected from the connected electronic processing device and a visual presentation piece of equipment is in a warm-up power on phase,
a video source from the connected electronic processing device is in control of said at least one piece of the one or more pieces of audio-visual presentation equipment,
a video source from the connected electronic processing device is not in control of said at least one piece of the one or more pieces of audio-visual presentation equipment, and
a button has been pressed but no video source from the connected electronic processing device is present.

* * * * *